(12) United States Patent  
Altmann

(10) Patent No.: US 7,044,597 B2
(45) Date of Patent: May 16, 2006

(54) MULTIFOCAL CONTACT LENS AND METHOD OF MANUFACTURE THEREOF

(75) Inventor: Griffith E. Altmann, Pittsford, NY (US)

(73) Assignee: Bausch & Lomb Incorporated, Rochester, NY (US)

( * ) Notice: Subject to any disclaimer, the term of this patent is extended or adjusted under 35 U.S.C. 154(b) by 0 days.

(21) Appl. No.: 10/736,960

(22) Filed: Dec. 16, 2003

(65) Prior Publication Data

US 2005/0128432 A1    Jun. 16, 2005

(51) Int. Cl.
*G02C 7/04* (2006.01)
(52) U.S. Cl. .................. 351/161; 351/177; 351/168
(58) Field of Classification Search .......... 351/159, 351/161, 164, 168, 169, 177, 178, 160 R, 351/160 H; 623/6.11, 6.19, 6.2, 6.21, 6.24, 623/6.25, 6.27, 6.28, 6.3, 6.31
See application file for complete search history.

(56) References Cited

U.S. PATENT DOCUMENTS

| | | | |
|---|---|---|---|
| 3,623,800 A | 11/1971 | Volk | 351/169 |
| 3,950,082 A | 4/1976 | Volk | 351/169 |
| 4,002,439 A | 1/1977 | Volk | 451/42 |
| 4,427,272 A | 1/1984 | Gernet | 351/173 |
| 4,580,883 A | 4/1986 | Shinohara | 351/169 |
| 4,636,211 A | 1/1987 | Nielsen et al. | 623/6.28 |
| 4,729,651 A | 3/1988 | Kitani | 351/169 |
| 4,861,153 A | 8/1989 | Winthrop | 351/169 |
| 4,881,805 A | 11/1989 | Cohen | 351/161 |
| 4,950,057 A | 8/1990 | Shirayanagi | 351/169 |
| 4,971,432 A | 11/1990 | Koeniger | 351/161 |
| 4,976,534 A | 12/1990 | Miege et al. | 351/161 |
| 4,995,714 A | 2/1991 | Cohen | 351/161 |
| 5,106,180 A | 4/1992 | Marie et al. | 351/161 |
| 5,112,351 A | 5/1992 | Christie et al. | 623/6.28 |
| 5,114,220 A | 5/1992 | Baude et al. | 351/160 R |
| 5,121,980 A | 6/1992 | Cohen | 351/161 |
| 5,123,725 A | 6/1992 | Winthrop | 351/169 |
| 5,125,729 A | 6/1992 | Mercure | 351/161 |
| 5,158,572 A | 10/1992 | Nielsen | 623/6.28 |
| RE34,132 E | 11/1992 | Kitani | 351/169 |
| 5,166,711 A | 11/1992 | Portney | 351/161 |
| 5,166,712 A | 11/1992 | Portney | 351/161 |
| RE34,251 E | 5/1993 | Achatz et al. | 623/6.17 |
| 5,214,453 A | 5/1993 | Giovanzana | 351/161 |
| 5,225,858 A | 7/1993 | Portney | 351/161 |
| 5,270,744 A | 12/1993 | Portney | 351/161 |
| 5,278,592 A | 1/1994 | Marie et al. | 351/160 R |
| 5,517,260 A | 5/1996 | Glady et al. | 351/169 |
| 5,574,518 A | 11/1996 | Mercure | 351/161 |
| 5,608,471 A | 3/1997 | Miller | 351/161 |

(Continued)

FOREIGN PATENT DOCUMENTS

EP    0982618 A1    3/2000

(Continued)

*Primary Examiner*—Jordan M. Schwartz
*Assistant Examiner*—Jessica Stultz
(74) *Attorney, Agent, or Firm*—John E. Thomas

(57) ABSTRACT

An optical zone for a lens has a center optical axis. A first region of the optical zone includes a first optical curve having a first optical axis that is collinear with the center optical axis. A plurality of secondary regions is formed within the first region. Each of the secondary regions has a respective secondary optical curve with a corresponding secondary optical axis. Each secondary optical axis is collinear with the first optical axis. Each of the secondary optical curves is decentered relative to the first optical curve.

22 Claims, 3 Drawing Sheets

U.S. PATENT DOCUMENTS

| | | | |
|---|---|---|---|
| 5,650,837 A | 7/1997 | Roffman et al. | 351/161 |
| 5,691,797 A | 11/1997 | Seidner et al. | 351/161 |
| 5,718,154 A | 2/1998 | Council | 82/1.11 |
| 5,754,270 A | 5/1998 | Rehse et al. | 351/161 |
| 5,847,802 A | 12/1998 | Menezes et al. | 351/161 |
| 5,864,378 A | 1/1999 | Portney | 351/160 R |
| 5,864,379 A | 1/1999 | Dunn | 351/161 |
| 5,867,246 A | 2/1999 | Edwards et al. | 351/169 |
| 5,919,229 A | 7/1999 | Portney | 623/6.27 |
| 5,953,098 A | 9/1999 | Lieberman et al. | 351/160 R |
| 6,007,201 A | 12/1999 | Wada et al. | 351/161 |
| 6,030,077 A | 2/2000 | Sawano et al. | 351/161 |
| 6,092,899 A | 7/2000 | Wanders | 351/161 |
| 6,102,544 A | 8/2000 | Baudart et al. | 351/169 |
| 6,116,735 A | 9/2000 | Wada | 351/161 |
| 6,120,148 A | 9/2000 | Fiala et al. | 351/161 |
| 6,142,625 A | 11/2000 | Sawano et al. | 351/161 |
| 6,176,579 B1 | 1/2001 | Mandell | 351/161 |
| 6,221,105 B1 | 4/2001 | Portney | 623/5.11 |
| 6,231,184 B1 | 5/2001 | Menezes et al. | 351/169 |
| 6,286,956 B1 | 9/2001 | Oyama et al. | 351/161 |
| 6,322,213 B1 | 11/2001 | Altieri et al. | 351/161 |
| 6,322,215 B1 | 11/2001 | Bristol | 351/171 |
| 6,357,876 B1 | 3/2002 | Oyama et al. | 351/161 |
| 6,364,483 B1 | 4/2002 | Grossinger et al. | 351/161 |
| 6,390,622 B1 | 5/2002 | Muckenhirn et al. | 351/161 |
| 6,409,339 B1 | 6/2002 | Wanders | 351/161 |
| 6,409,340 B1 | 6/2002 | Portney | 351/161 |
| 6,474,814 B1 | 11/2002 | Griffin | 351/161 |
| 6,511,178 B1 | 1/2003 | Roffman et al. | 351/161 |
| 6,536,899 B1 | 3/2003 | Fiala | 351/168 |
| 6,537,317 B1 | 3/2003 | Steinert et al. | 623/6.24 |
| 6,547,822 B1 | 4/2003 | Lang | 623/6.28 |
| 6,554,859 B1 | 4/2003 | Lang et al. | 623/6.28 |
| 6,557,998 B1 | 5/2003 | Portney | 351/168 |
| 6,582,076 B1 | 6/2003 | Roffman et al. | 351/161 |
| 6,771,435 B1 * | 8/2004 | Hosoe | 359/719 |
| 6,921,168 B1 * | 7/2005 | Lindacher et al. | 351/160 R |
| 2002/0044255 A1 | 4/2002 | Ye | 351/168 |
| 2002/0135733 A1 | 9/2002 | Portney | 351/161 |
| 2002/0149743 A1 | 10/2002 | Portney | 351/161 |
| 2003/0014107 A1 | 1/2003 | Reynard | 623/6.24 |
| 2003/0043342 A1 | 3/2003 | Seidner | 351/161 |
| 2003/0117577 A1 | 6/2003 | Jones et al. | 351/164 |

FOREIGN PATENT DOCUMENTS

| | | |
|---|---|---|
| EP | 1126310 A2 | 8/2001 |
| GB | 2364136 A | 1/2002 |
| WO | WO 00/08516 A1 | 2/2000 |
| WO | WO 01/63344 A1 | 8/2001 |
| WO | WO 02/03126 A1 | 1/2002 |
| WO | WO 02/32297 A2 | 4/2002 |
| WO | WO 03/034949 A2 | 5/2003 |

* cited by examiner

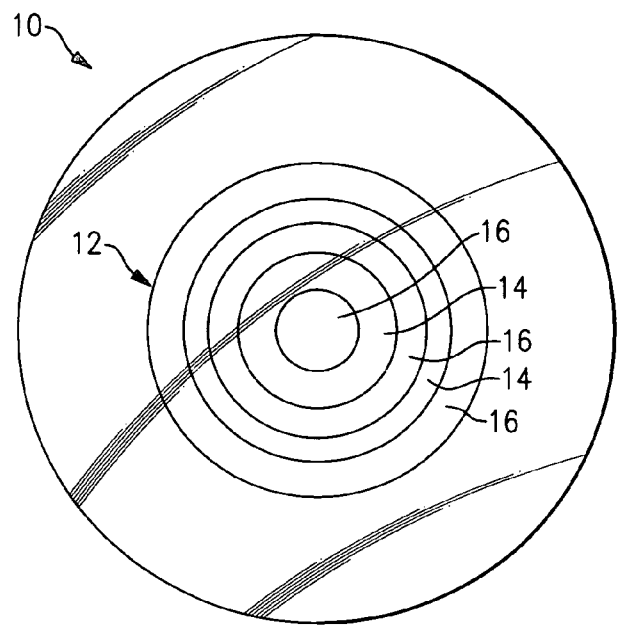
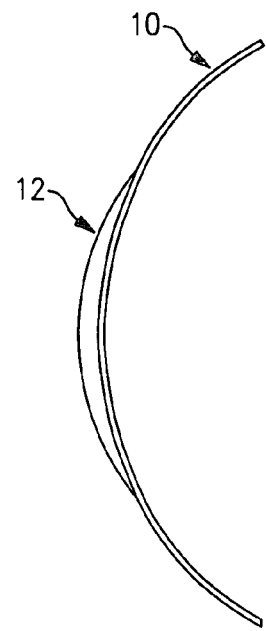
FIG.1a   FIG.1b
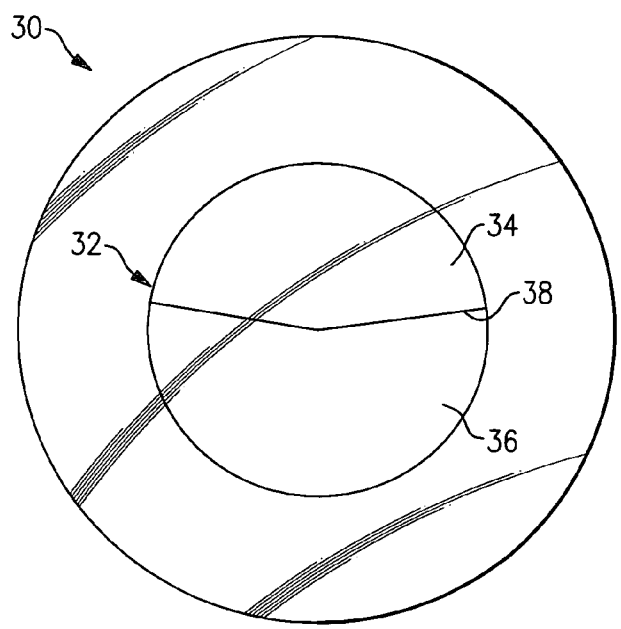
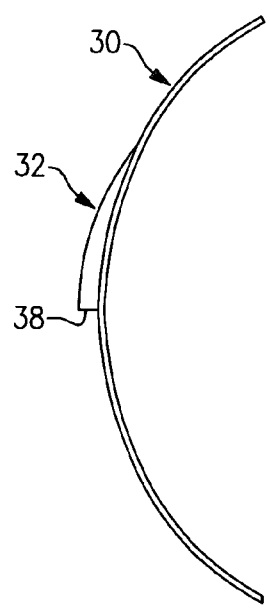
FIG.2a   FIG.2b

MULTIFOCAL CONTACT LENS AND METHOD OF MANUFACTURE THEREOF

FIELD OF THE INVENTION

The present invention relates to contact lenses. More particularly, the present invention relates to a contact lens that combines the desirable characteristics of simultaneous and translating bifocal and/or multifocal lenses, and a method of manufacturing such a lens.

BACKGROUND OF THE INVENTION

FIG. 1 (not drawn to scale) shows an exemplary conventional bifocal contact lens 10 having an optical zone 12. Optical zone 12 is comprised of concentric zones of alternating near viewing regions 14 and distance viewing regions 16. When viewing a distant image through optical zone 12, the image appears focused and clear when viewed through distance regions 16 but out of focus when viewed though near regions 14. A similar effect occurs when viewing a near object. In effect, the wearer experiences an undesirable effect referred to as simultaneous vision in which the image appears in focus but is surrounded by an out-of-focus halo.

Near viewing regions 14 and distance viewing regions 16 are continuous around optical zone 12. Thus, lens 10 may rotate freely in the eye and no ballasting techniques are required to maintain orientation of lens 10. The ability of lens 10 to freely rotate provides for more efficient flushing of the surface of lens 10 with tears when the wearer thereof blinks.

Thus, although conventional bifocal contact lens 10 is efficiently flushed with tears, the wearer may experience undesirable simultaneous vision.

FIG. 2 (not drawn to scale) shows an exemplary conventional translating bifocal contact lens 30 having an optical zone 32. Optical zone 32 is divided into a superior region 34 that is optimized for distance vision and an inferior region 36 that is optimized for near vision. When the wearer looks down to read or view a near object his or her pupil is disposed mostly in the inferior or near-viewing region 36. When the wearer looks forward at a distant object the pupil is mostly disposed in the superior or distance region 34. Thus, translating bifocal contact lens 30 reduces the occurrence of simultaneous vision. The translating bifocal is a popular lens configuration because it enables the wearer to shift the amount of light to the pupil and provides better visual quality than simultaneous bifocal contact lenses.

However, inferior or near region 36 generally has a steeper curve than superior or distance region 34. In order to compensate for that relatively steep curve and maintain a generally round shape, translating bifocal contact lens 30 is typically thicker than other contact lenses and has a large step 38 (i.e., a sudden increase and/or decrease in thickness) between inferior/near region 36 and superior/distance region 34 (which is exaggerated as shown in FIG. 2). The relative thickness of translating bifocal contact lens 30 and the large step 38 between the inferior/near region 36 and superior/distance region 34 thereof may cause discomfort to some wearers.

Furthermore, ballasting techniques (not shown) must be used to orient translating bifocal contact lens 30 such that near objects are viewed through the inferior/near region 36 and distant objects are viewed through the superior/distance region 34. Ballasting techniques reduce the efficiency with which a lens is flushed. The extra thickness of these lenses and the required ballasting techniques reduce the oxygen transfer to the surface of the eye and could lead to an increased risk of corneal edema.

Thus, although reducing simultaneous vision and providing better visual quality than simultaneous bifocal contact lens 10, translating bifocal contact lens 30 reduces oxygen transfer to the eye, is flushed less efficiently, and may be uncomfortable to some wearers.

Therefore, what is needed in the art is a multifocal contact lens that reduces the occurrence of simultaneous vision and which provides improved visual quality without reducing oxygen transfer to the eye.

Furthermore, what is needed in the art is a multifocal contact lens that reduces the occurrence of simultaneous vision and which provides improved visual quality while still providing for relatively efficient flushing of the lens.

Moreover, what is needed in the art is a multifocal contact lens that reduces the occurrence of simultaneous vision and which provides improved visual quality without requiring large steps between visual regions which may cause wearer discomfort.

Lastly, what is needed in the art is a multifocal contact lens that combines the desirable qualities, characteristics, and properties of simultaneous vision contact lenses with those of translating vision contact lenses.

SUMMARY OF THE INVENTION

The present invention provides a contact lens and method for making same. Further, the present invention provides an optical zone for a contact lens, and a method for making that optical zone.

The invention comprises, in one form thereof, an optical zone having a center optical axis. A first region of the optical zone includes a first optical curve having a first optical axis that is collinear with the center optical axis. A plurality of secondary regions are formed within the first region. Each of the secondary regions has a respective secondary optical curve with a corresponding secondary optical axis. Each secondary optical axis is collinear with the first optical axis. Each of the secondary optical curves is decentered relative to the first optical curve.

An advantage of the lens of the present invention is that the occurrence of simultaneous vision is reduced and improved visual quality is provided without a substantial reduction in the amount of oxygen transferred to the eye.

Another advantage of the lens of the present invention is that the occurrence of simultaneous vision is reduced and improved visual quality is provided without substantially reducing the efficiency with which the lens is flushed by tears.

Yet another advantage of the contact lens of the present invention is that the occurrence of simultaneous vision is reduced and improved visual quality is provided without requiring large steps between visual regions, thereby reducing discomfort to lens wearers.

A still further advantage of the contact lens of the present invention is that the desirable qualities, characteristics, and properties of simultaneous vision contact lenses are combined with those of translating vision contact lenses.

BRIEF DESCRIPTION OF THE DRAWINGS

The above-mentioned and other features and advantages of this invention, and the manner of attaining them, will become apparent and be better understood by reference to the following description of one embodiment of the invention in conjunction with the accompanying drawings, wherein:

FIGS. 1a and 1b are front and side views, respectively, of a conventional concentric bifocal contact lens;

FIGS. 2a and 2b are front and side views, respectively, of a conventional translating bifocal contact lens;

Corresponding reference characters indicate corresponding parts throughout the several views. The exemplifications set out herein illustrate one preferred embodiment of the invention, in one form, and such exemplifications are not to be construed as limiting the scope of the invention in any manner.

DESCRIPTION OF THE PREFERRED EMBODIMENTS

Figure 3:
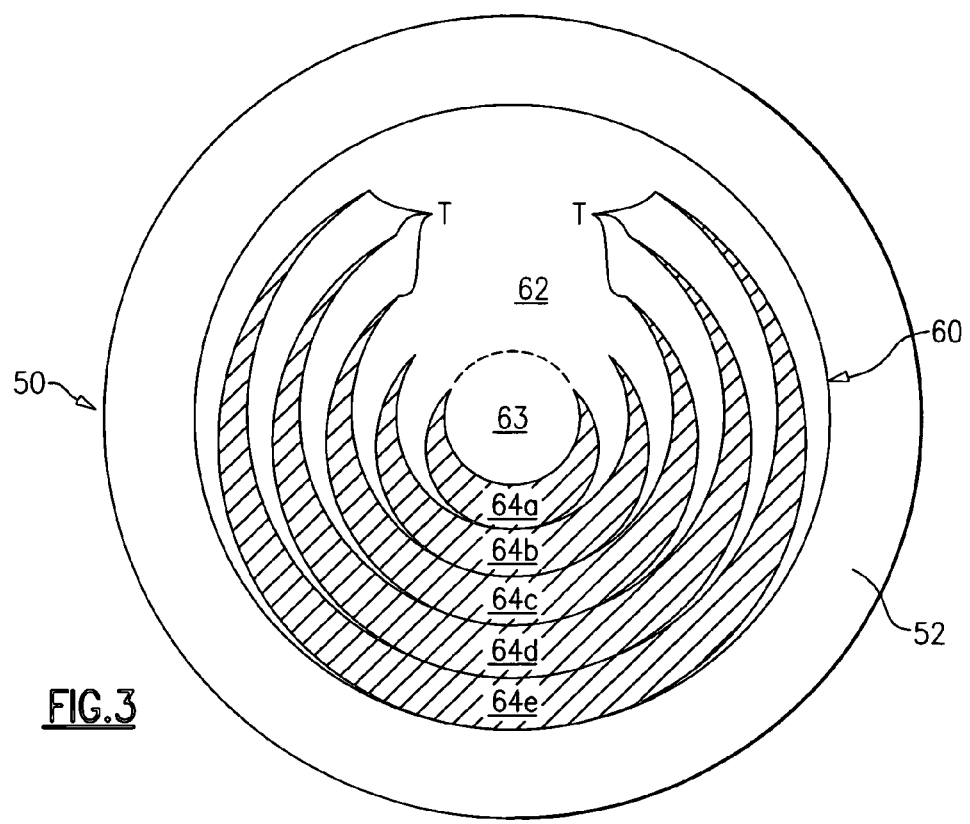
FIG. 3 is a front view of one embodiment of a multifocal contact lens of the present invention.
Figure 4:
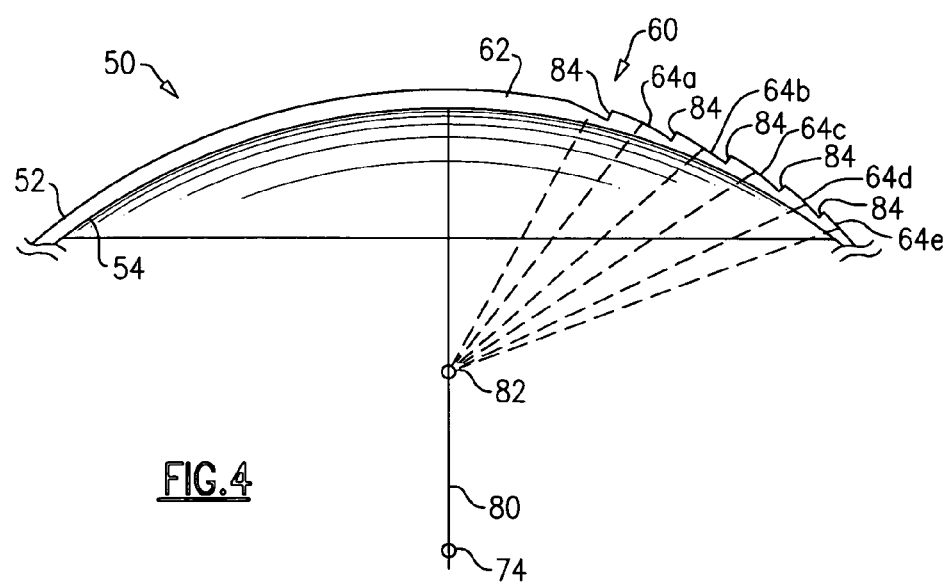
FIG. 4 is a side profile view of the optical zone of the contact lens of FIG. 3.

Referring now to FIGS. 3 and 4, one embodiment of a contact lens of the present invention is shown. As best shown in FIG. 4, lens 50 includes an anterior surface 52 and a posterior surface 54. Anterior surface 52 includes an optical zone 60 formed therein according to a method to be hereinafter described, and posterior surface 54 is formed to conform to the cornea of a wearer in known fashion.

Optical zone 60 includes first region 62, central zone 63 and secondary regions 64a, 64b, 64c, 64d, 64e. For each region, the optical curve is a sphere. First region 62 is primarily disposed in the superior region of optical zone 60, and secondary regions 64a–e are disposed primarily in the inferior region of optical zone 60. Secondary regions 64a–e are substantially concentric relative to each other. Generally, lens 50 is designed for distance viewing by configuring first region 62 as a distance viewing region. Secondary regions 64a–e may be configured as near or intermediate viewing regions, or a combination thereof. Central region 63 can be configured either as a distance, intermediate or near viewing region to thereby optimize lens 52 for distance, intermediate or near viewing, respectively. As shown in FIGS. 3 and 4, first region 62 and central region 63 are configured as distance viewing regions, whereas secondary regions 64a–e are configured as near viewing regions, and therefore lens 50 is configured as a bifocal lens with a distance-viewing central region.

Referring again to FIG. 4, lens 50 is shown in profile. First region 62 is formed such that the center of the apical or vertex radius 74 thereof lies along and/or upon optical axis 80. It should be particularly noted that the center 74 of the apical or vertex radius is hereinafter referred to simply as a center of curvature 74. However, it is to be understood that the term "center of curvature" is used herein to refer to the center of aspherical as well as spherical surfaces, and that when used in connection with an aspherical surface the term "center of curvature" refers to the center of the apical or vertex radius of that particular surface.

Secondary regions 64a–e are formed in optical zone 60 of lens 50 such that the centers of curvature thereof, collectively designated 82 in FIG. 4, also lie along optical axis 80. Thus, secondary regions 64a–e, central region 63 and first region 62 are monocentric with respect to each other, i.e., they share a common optical axis. The monocentricity of first region 62 and secondary regions 64a–e reduces the potential that the lens wearer will be subjected to asymmetrical ghost images, and reduces the potential for the patient to be subjected to a "jump" in the viewed image as the contact lens translates on the eye. Adjacent secondary regions 64a–e are separated from each other by steps (not referenced) along the superior-inferior meridian having step heights 84. Step heights 84 are maintained below a predetermined maximum, such as, for example, 10 µm, to minimize wearer discomfort. It should be understood, however, that step height 84 may not be the same for all secondary regions 64a–e and that step height 84 will not be constant along junctions between secondary regions 64a–e, but will remain below the stated maximum.

Although the centers of curvature of secondary regions 64a–e are shown as one point 82, one skilled in the art will recognize that the centers of curvature of secondary regions 64a–e are actually distinct points that may be slightly spaced apart from each other along optical axis 80 such that center of curvature of secondary region 64a is relatively proximate to center of curvature 74 and the center of curvature of secondary region 64e is relatively distant from center of curvature 74.

In the embodiment shown, lens 50 is optimized for distance viewing by configuring central region 63 of optical zone 60 as a distance-optimized viewing region. However, it is to be understood that lens 50 can be alternately configured and optimized for near viewing by forming central region 63 of optical zone 60 as a near-optimized viewing region. The ability to form central region 63 of lens 50 as either a near-optimized or distance-optimized region renders lenses according to the present invention appropriate for monovision applications in which the contact lens in one eye is optimized for near vision and the contact lens in the other eye is optimized for distance viewing.

In the embodiment shown, lens 50 is configured as a bifocal lens and therefore secondary regions 64a–e are each configured with the same or substantially the same optical power. However, it is to be understood that lens 50 can be alternately configured as a multifocal lens by configuring some of secondary regions 64a–e as near-range optimized viewing regions and some other of secondary regions 64a–e as intermediate-range optimized viewing regions.

Figure 5A:
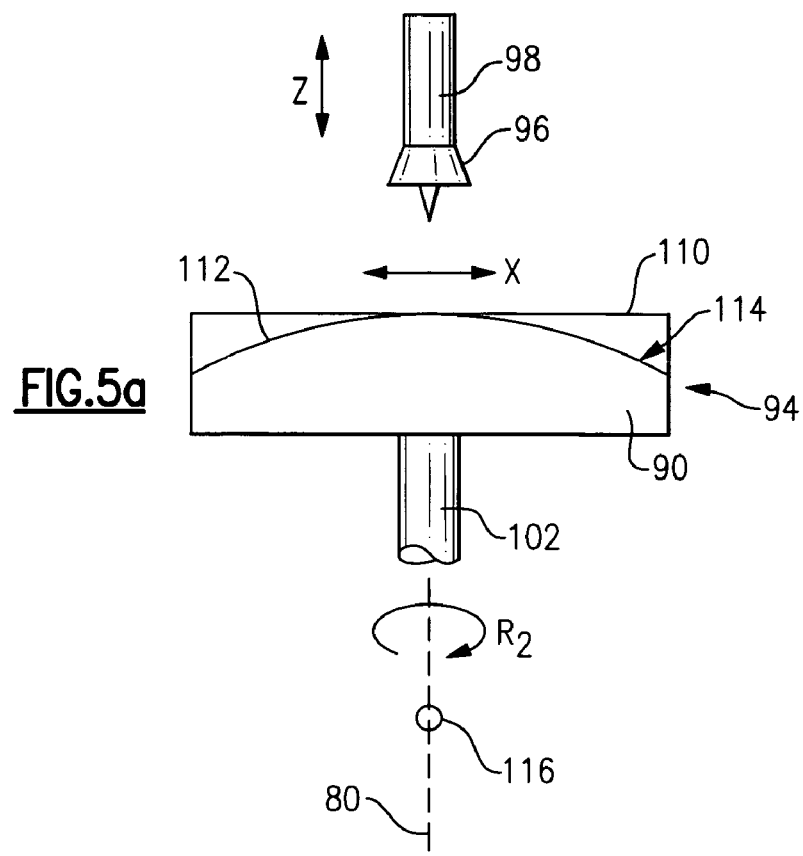
FIGS. 5(a)–(b) illustrate the process steps for production of the invention.
Figure 5B:
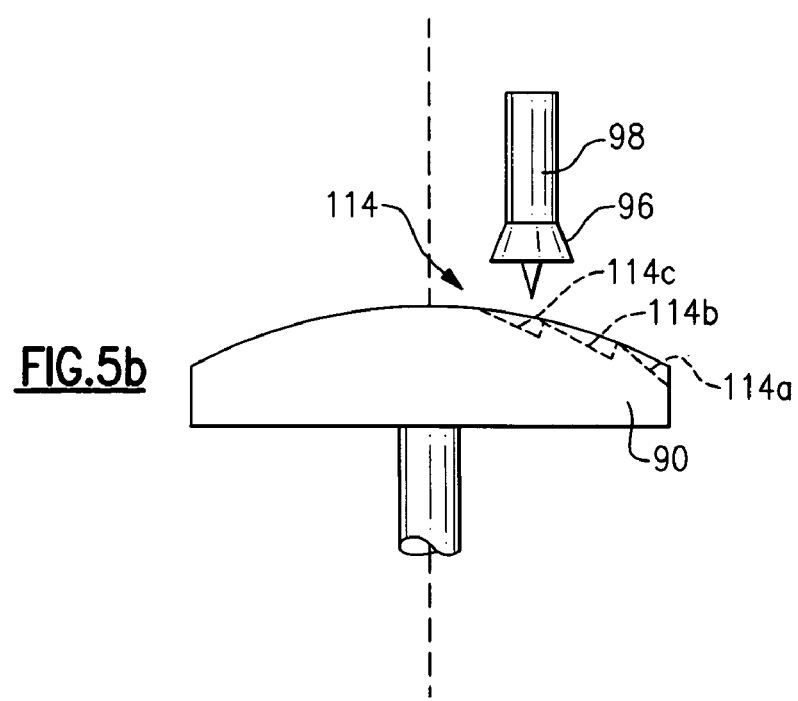

Referring now to FIGS. 5(a) and 5(b), one embodiment of a method for manufacturing a lens according to the present invention is shown. Lens 50 is molded from silicone, Hydroxyethyl methacrylate (HEMA), or other suitable materials that are biocompatible with the cornea. Generally, a mold tool, preferably constructed of nickel on steel, is machined and anterior molds are made from the machined mold tool. The anterior molds are typically constructed of an injection molded plastic material, such as, for example, polypropylene or polyvinyl chloride. The molds are then used to cast mold contact lenses according to the present invention.

Mold tool 90 is formed from a material blank 94, such as, for example, a blank of steel or other appropriately hard material, that is machined by diamond cutting tool 96 into the desired shape of lens 50. Cutting tool 96 is mounted on an oscillating and/or reciprocating tool holder or tool post assembly 98. Generally, tool holder 98 is translatable in the direction of the x-axis, and is capable of precise and very rapid axial oscillation and/or reciprocation in the z-axis direction. One embodiment of such a tool holder is more fully described in U.S. Pat. No. 5,718,154, entitled RECIPROCATING TOOL HOLDER ASSEMBLY, the disclosure of which is incorporated herein by reference.

The material blank 94 from which the mold is to be formed is mounted on work piece collet 102 that is rotatable in direction θ. Cutting tool 96 is then controlled, such as, for example, by numerical or computer control, and is simultaneously translated along the x-axis and reciprocally adjusted along the z-axis to create the desired shape of lens 50.

More particularly, upper surface 110 of material blank 94 is cut to form surface 112 (FIG. 5a), which corresponds to anterior surface 52 of lens 50. During the same or a subsequent pass of cutting tool 96, upper surface 110 of material blank 94 is also cut to create surface 114 that conforms to the desired curve of first region 62 of optical zone 60 and which has a center of curvature 116 that is coincident with central or optical axis 80 (FIG. 5a). Thereafter, surface 114 is further cut to create surfaces 114a, 114b and 114c (FIG. 5b) that correspond to particular secondary regions 64a–e of optical zone 60. If desired, additional surfaces corresponding to additional secondary regions 64a–e are also formed as described above.

To create surfaces 114a, 114b and 114c cutting tool 96 (via tool holder 98) is translated from the outside of surface 114 toward the inside thereof, i.e., along the x-axis. As tool holder 98 and, thereby, cutting tool 96 are translated in the direction of the x-axis, cutting tool 98 and tool holder 96 are also oscillated and/or reciprocated in the z-axis direction to thereby cut surfaces 114a, 114b, and 114c. Cutting tool 96 is lowered into contact with surface 114 at a location corresponding to one of tips T (FIG. 3) of secondary regions 64a–e and is raised from surface 114 at a second location corresponding to the opposite tip T in that same secondary region. Surfaces 114a–c appear as ramp-like surfaces when mold 90 is viewed in profile and/or cross-section (see FIG. 5b), and correspond to secondary regions 64a–e. The apparent tilt of surfaces 114a, 114b, and 114c is provided by the reciprocation and/or oscillation of cutting tool 96 by tool holder 98, which essentially produces a titled surface without the need to tilt either the cutting tool 96, tool holder 98, collet 102 and/or mold tool 90.

The equation that controls the curve of the surfaces 114a, 114b and 114c is:

$$z = \frac{x^2/R}{1+(1-(x^2/R^2))^{1/2}} + a\sin\theta$$

Where, $x^2/R$ is the term for the curve of the region, R is the apical radius of the curve, k is the conic constant of the curve, and $$1+(1-(x^2/R^2))^{1/2}$$

wherein θ is the angular orientation of mold tool 90 relative to central axis 80 (FIG. 5a–b).

The surfaces 114a, 114b and 114c have a common optical axis that corresponds to and is co-axial relative to optical axis 80 of lens 50. The surfaces 114a, 114b, 114c, are cut into the material blank 94 in such a manner so as to maintain a maximum step height 84 of 10 μm. Cutting tool 96 is then raised to the edge of the step and a new surface (not shown) corresponding to one of secondary regions 64a–e is cut into material blank 94. This process is repeated until the number of surfaces 114a–c created in material blank 94 correspond to the desired number of secondary regions 64a–e to be included in lens 50. Subsequent process steps for mounting the lens to appropriate ballasting systems are conventional and need not be separately illustrated. The formation of the posterior portion 54 of lens 50 is also conventional and is therefore not shown in detail.

Once mold tool 90 is completely formed, anterior molds are constructed by conventional injection molding techniques. A plastic material, such as, for example, polypropylene or polyvinyl chloride, is injection molded to the shape of the finished upper or machined surface 114 of mold tool 90. The molds are then used in a known manner to cast mold contact lenses according to the present invention.

In the embodiment shown, a mold tool is formed which is used to form a mold that, in turn, is used to cast mold contact lenses according to the present invention. However, it is to be understood that the method for forming the contact lenses of the present invention can be alternately performed, such as, for example, directly forming the optical zone of a contact lens of the present invention without the use of a mold tool and/or mold. In such an embodiment, the various features of optical zone 60 are formed, such as, for example, by diamond-turning, chemical etching and/or laser cutting, directly upon the appropriate portion of anterior surface 52 of contact lens 50.

It is to be further noted that the intermediate injection molds formed by mold tool 90 create the negative images of the various features and/or surfaces, including surfaces 114a, 114b, 114c and 114 of mold tool 90, that correspond to the features and/or surfaces of optical zone 60.

It should be understood that the locations of the tips T (FIG. 3) of secondary regions 64a–e within first region 62 can be alternately configured to adjust the optimization of lens 50. More particularly, and as an example, raising tips T higher into first region 62 and/or bringing tips T closer together renders lens 50 more near optimized when secondary regions 64a–e are near-viewing optimized regions. Conversely, and as a second example, lowering tips T within first region 62 and/or spacing tips T further apart renders lens 50 more distance optimized.

While this invention has been described as having a preferred design, the present invention can be further modified within the spirit and scope of this disclosure. This application is therefore intended to cover any variations, uses, or adaptations of the present invention using the general principles disclosed herein. Further, this application is intended to cover such departures from the present disclosure as come within the known or customary practice in the art to which this invention pertains and which fall within the limits of the appended claims.

What is claimed is:

1. An optical zone for a lens, said optical zone having a center optical axis and a diameter dividing said optical zone into a superior portion and an inferior portion, said optical zone comprising:
    a first region formed within said optical zone and having a first optical curve, said first optical curve having a first optical axis collinear with said center optical axis; and
    a plurality of secondary regions formed within said first region, each of said secondary regions having respective secondary optical curves, each of said secondary optical curves having a corresponding secondary optical axis, each said secondary optical axis being collinear with said first optical axis, each of said secondary optical curves being decentered relative to said first optical curve,
    wherein said first region is primarily disposed in the superior portion of the optical zone and said second regions are primarily disposed in the inferior portion of the optical zone.

2. The optical zone of claim 1, wherein said first region comprises a distance-optimized region, said plurality of secondary regions comprising near-optimized regions.

3. The optical zone of claim 1, wherein said first region comprises a distance-optimized region, said plurality of secondary regions comprising at least one region optimized for near viewing and at least one region optimized for intermediate-range viewing.

4. The optical zone of claim 1, wherein said first region comprises a near-optimized region, said plurality of secondary regions comprising a plurality of regions optimized for distance viewing.

5. The optical zone of claim 1, wherein said first region comprises a near-optimized region, said plurality of secondary regions comprising at least one region optimized for distance viewing and at least one region optimized for intermediate-range viewing.

6. A contact lens, comprising:
    a body having an anterior surface, a posterior surface and a diameter; and
    an optical zone defined on said anterior surface, said optical zone having a center optical axis and said diameter dividing the optical zone into a superior portion and an inferior portion, said optical zone including a first region and a plurality of second regions, said first region having a first optical curve, said first optical curve having a first optical axis collinear with said center optical axis, said plurality of second regions disposed within said first region, each of said plurality of second regions having respective second optical curves with corresponding second optical axes, said second optical axes being collinear with said first optical axis, each of said secondary optical curves being decentered relative to said first optical curve, and wherein said first region is primarily disposed in the superior portion of the optical zone and said second regions are primarily disposed in the inferior portion of the optical zone.

7. The contact lens of claim 6, wherein said first region comprises a distance-optimized region, said plurality of second regions comprising near-viewing optimized regions.

8. The contact lens of claim 6, wherein said first region comprises a distance-optimized region, said plurality of secondary regions comprising at least one region optimized for near viewing and at least one region optimized for intermediate-range viewing.

9. The contact lens of claim 6, wherein said first region comprises a near-optimized region, said plurality of secondary regions comprising a plurality of regions optimized for distance viewing.

10. The contact lens of claim 6, wherein said first region comprises a near-optimized region, said plurality of secondary regions comprising at least one region optimized for distance viewing and at least one region optimized for intermediate-range viewing.

11. The contact lens of claim 6, wherein said first optical curve and said plurality of second optical curves are monocentric.

12. The contact lens of claim 6, further comprising a transition between adjacent first and second regions, said transition being substantially smooth when a first region circumscribes an adjacent second region, said transition being a step when a second region circumscribes an adjacent first region.

13. The contact lens of claim 6, wherein said first region has an area that is larger than a cumulative area of said second regions.

14. The contact lens of claim 6, wherein said first region has an area that is smaller than a cumulative area of said second regions.

15. The contact lens of claim 6, wherein the relative areas of the first and second regions are adjusted to provide a desired degree of at least one of distance, near, and intermediate vision.

16. A method for manufacturing a contact lens, said contact lens having an anterior surface and a diameter, said method comprising the steps of:
    fabricating a first optical curve on at least a portion of the anterior surface, the first optical curve defining an optical zone of the contact lens, the first optical curve having an optical axis that passes through a center of the optical zone, and the optical zone being divided by the diameter into a superior portion and an inferior portion; and
    fabricating a plurality of second optical curves within the optical zone, each said second optical curves being decentered relative to the first optical curve by a respective amount, each said second optical curves having a respective optical axis that is collinear relative to the optical axis of the first optical curve, and wherein said second optical curves are primarily disposed in the inferior portion of the optical zone.

17. The method of claim 16, wherein said fabricating a plurality of second optical curves step comprises removing an arcuate portion of a surface of the optical zone.

18. The method of claim 16, wherein said fabricating a plurality of second optical curves step comprises removing an arcuate portion of a surface of the optical zone with an oscillating lathe tool.

19. A method of forming a mold tool, the mold tool for use in creating molds for use in molding contact lenses, the method of forming a mold tool comprising:
    fabricating a first optical curve on at least a portion of a first surface of the mold tool, the first optical curve defining a first zone corresponding to an optical zone of the contact lenses, the first optical curve having an optical axis that passes through the center of the optical zone, and said optical zone having a diameter dividing the optical zone into a superior portion and an inferior portion; and
    fabricating a plurality of second optical curves on the first surface of the mold tool and within the first zone, each of said second optical curves being decentered relative to the first optical curve by a respective amount, each of said second optical curves having an optical axis that is collinear relative to the optical axis of the first optical curve, and said second optical curves being primarily disposed in the inferior portion of the optical zone.

20. The method of forming a mold tool of claim 19, wherein said fabricating a first optical curve step comprises:
    rotating the mold tool in a centered collet; and
    engaging the first surface of the mold tool with a cutting tool to thereby form the first optical curve.

21. The method of forming a mold tool of claim 19, wherein said fabricating a plurality of second optical curves step comprises:
    decentering the optical axis of the first optical curve relative to the axis of rotation of a lathe spindle;

rotating the mold tool; and engaging the first surface of the mold tool within the first zone thereof with a cutting tool to thereby form a first of said plurality of second optical curves within the optical zone of the mold tool.

22. The method of forming a mold tool of claim 21, comprising repeating the decentering, rotating and engaging steps to thereby form additional second optical curves within the optical zone of the mold tool.

* * * * *